United States Patent
Tyner

(10) Patent No.: US 6,564,276 B1
(45) Date of Patent: May 13, 2003

(54) ACCESS RESTRICTION OF ENVIRONMENTAL CIRCUITS

(75) Inventor: Benjamen G. Tyner, Austin, TX (US)

(73) Assignee: Dell USA L.P., Round Rock, TX (US)

( * ) Notice: Subject to any disclaimer, the term of this patent is extended or adjusted under 35 U.S.C. 154(b) by 0 days.

(21) Appl. No.: 09/491,073

(22) Filed: Jan. 25, 2000

(51) Int. Cl.[7] .............................. G06F 13/24; G06F 9/44

(52) U.S. Cl. ...................................... 710/260; 712/244

(58) Field of Search ................................ 710/260–269, 710/46–50; 712/244; 713/200–202

(56) References Cited

U.S. PATENT DOCUMENTS

| | | | |
|---|---|---|---|
| 4,525,780 A | | 6/1985 | Bratt et al. .................. 364/200 |
| 4,866,599 A | * | 9/1989 | Morganti et al. ........... 713/200 |
| 4,868,738 A | | 9/1989 | Kish et al. ................... 364/200 |
| 5,146,565 A | * | 9/1992 | Blanck et al. ................. 710/36 |
| 5,590,312 A | | 12/1996 | Marisetty .................... 395/500 |
| 5,657,445 A | * | 8/1997 | Pearce ........................... 710/37 |
| 5,692,219 A | | 11/1997 | Chan et al. .................. 395/869 |
| 5,729,760 A | * | 3/1998 | Poisner ........................... 710/3 |
| 5,768,631 A | | 6/1998 | Kam et al. .................. 395/892 |
| 5,796,984 A | | 8/1998 | Pearce et al. ............... 395/500 |
| 5,809,230 A | * | 9/1998 | Pereira ........................ 713/200 |
| 5,935,244 A | | 8/1999 | Swamy et al. .............. 713/200 |
| 5,946,469 A | | 8/1999 | Chidester .................... 395/500 |
| 5,953,736 A | | 9/1999 | O'Connor et al. ............. 711/6 |
| 5,968,157 A | | 10/1999 | Joy et al. .................... 710/200 |
| 5,991,856 A | * | 11/1999 | Spilo et al. .................. 711/147 |
| 6,093,213 A | * | 7/2000 | Favor et al. .................. 703/25 |
| 6,151,618 A | * | 11/2000 | Wahbe et al. ................. 709/1 |

OTHER PUBLICATIONS

SMBus and I[2]C Bus Design: Rev. 1.0; Apr. 18, 1997; 15 Pages. (Copy Enclosed).
Smart Battery System Specifications; *System Management Bus Specification: Revision 1.1*; Dec. 11, 1998; 39 Pages. (Copy Enclosed).
Ken Jeffries; *System And Method For Assigning Unique Addresses To Agents On A System Management Bus*; U.S. Serial No.: 08/866,678; Filed May 30, 1997. (Copy Not Enclosed).
Robert Bassman, Donald Carroll, Phil Chidester, and Anil Rao; *Communication System For Multiple Computer System Management Circuits*; U.S. Serial No.: 09/229,736; Filed Nov. 15, 1999. (Copy Not Enclosed).
Smart Battery System Specification; *System Management Bus BIOS Interface Specification: Revision 1.0*; Feb. 15, 1995; 34 Pages. (Copy Enclosed).

\* cited by examiner

*Primary Examiner*—Sumati Lefkowitz
(74) *Attorney, Agent, or Firm*—Baker Botts L.L.P.

(57) ABSTRACT

A system for restricting access to environmental circuits of a computer system. In one embodiment, the environmental circuits are accessible via a serial computer bus that conforms to a system management (SM) specification. I/O accesses to I/O registers assigned to a bus controller of the bus are trapped, wherein an interrupt such as a system management interrupt (SMI) is generated to invoke an interrupt handler that determines whether the I/O access corresponds to a restricted circuit access. If the I/O access corresponds to a restricted circuit access, then the interrupt handler prevents the circuit access from occurring. In one embodiment, I/O accesses to the I/O control register assigned to the bus controller are trapped. The interrupt handler determines whether a circuit access is restricted by reading the contents of the I/O address register and I/O command register assigned to the bus controller.

32 Claims, 4 Drawing Sheets

ACCESS RESTRICTION OF ENVIRONMENTAL CIRCUITS

BACKGROUND OF THE INVENTION

1. Field of the Invention

This invention relates in general to computer systems and in particular to restricting the access to environmental circuits accessible via a computer bus.

2. Description of the Related Art

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and peripheral devices that provide input and output for the system. Such peripheral devices may include display monitors, keyboards, mouse-type input devices, floppy and hard disk drives, CD-ROM drives, printers, network capability card circuits, terminal devices, modems, televisions, sound devices, voice recognition devices, electronic pen devices, and mass storage devices such as tape drives, CD-R drives, or DVDs.

Computer systems may also include environmental circuits for monitoring and/or controlling the environmental conditions in the computer system. Such circuits include sensors for monitoring the ambient temperature in the chassis of the computer system, sensors for monitoring the voltages of the power supplies, circuits for monitoring and controlling the operation of the fans of the computer system, a chassis intrusion circuit, and a battery voltage monitor circuit for notebook computers. Typically, these environmental circuits are accessible via a computer bus such as a computer bus conforming to the System Management Specification, Rev. 1.0.

With some computer systems, the operating system of the computer system can access the environmental circuits such that data can be written to these circuits. However, providing an operating system with the ability to access environmental circuits makes these circuits susceptible to the actions of a computer virus. For example, a computer virus may write to a fan controller circuit, a turn-on temperature setting that is so high that the fan will not operate, thereby placing the components of the computer system at risk from overheating. Another problem is that a user may inadvertently change environmental settings.

What is needed is a system to restrict access to environmental circuits of a computer system.

SUMMARY OF THE INVENTION

It has been discovered that providing a computer system with a system for restricting access to environmental circuits accessible via a computer bus advantageously reduces the susceptibility of those circuits to an undesirable adjustment in operating parameters.

In one aspect, a computer system includes a system processor, a system memory operably coupled to the system processor, and a computer bus. The computer system also includes a plurality of environmental circuits operably coupled to the computer bus. The computer system further includes a non-volatile memory storing computer code whose execution by the system processor implements an interrupt handler, which determines whether a circuit access to an environmental circuit of the plurality via the computer bus is restricted.

Another aspect includes a method for restricting access to environmental circuits operably coupled to a computer bus. The method includes generating an interrupt in response to an I/O access to an I/O register assigned to a bus controller of the computer bus. The method also includes determining whether the I/O access corresponds to a restricted circuit access to an environmental circuit operably coupled to the computer bus. The method further includes preventing the circuit access depending upon whether the I/O access is determined to correspond to a restricted circuit access.

In another aspect, a computer system includes a system processor, a system memory operably coupled to the system processor, and a serial computer bus operably coupled to the system processor. The computer system also includes a plurality of environmental circuits operably coupled to the serial computer bus and accessible via the serial computer bus. The computer system further includes a serial bus controller and a plurality of I/O registers assigned to the bus controller. The plurality of I/O registers includes an I/O command register, an I/O address register, and an I/O control register. The serial bus controller operates on contents of the I/O command register, I/O address register, and I/O control register to perform bus transactions on the computer bus for circuit access to environmental circuits of the plurality. The plurality of environmental circuits are accessible via circuit accesses by I/O accesses to the plurality of I/O registers. The computer system also includes a trap circuit for trapping an I/O access to at least one of the plurality of I/O registers and an interrupt controller having an output to generate an interrupt in response to the trap circuit trapping an I/O access to at least one of the plurality of I/O registers. The computer system further includes a non-volatile memory storing code whose execution by the system processor implements an interrupt handler in response to an interrupt generated by the interrupt controller due to a trapped I/O access to an I/O register of the plurality. The interrupt handler determines whether a circuit access corresponding to the trapped I/O access is a restricted circuit access.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
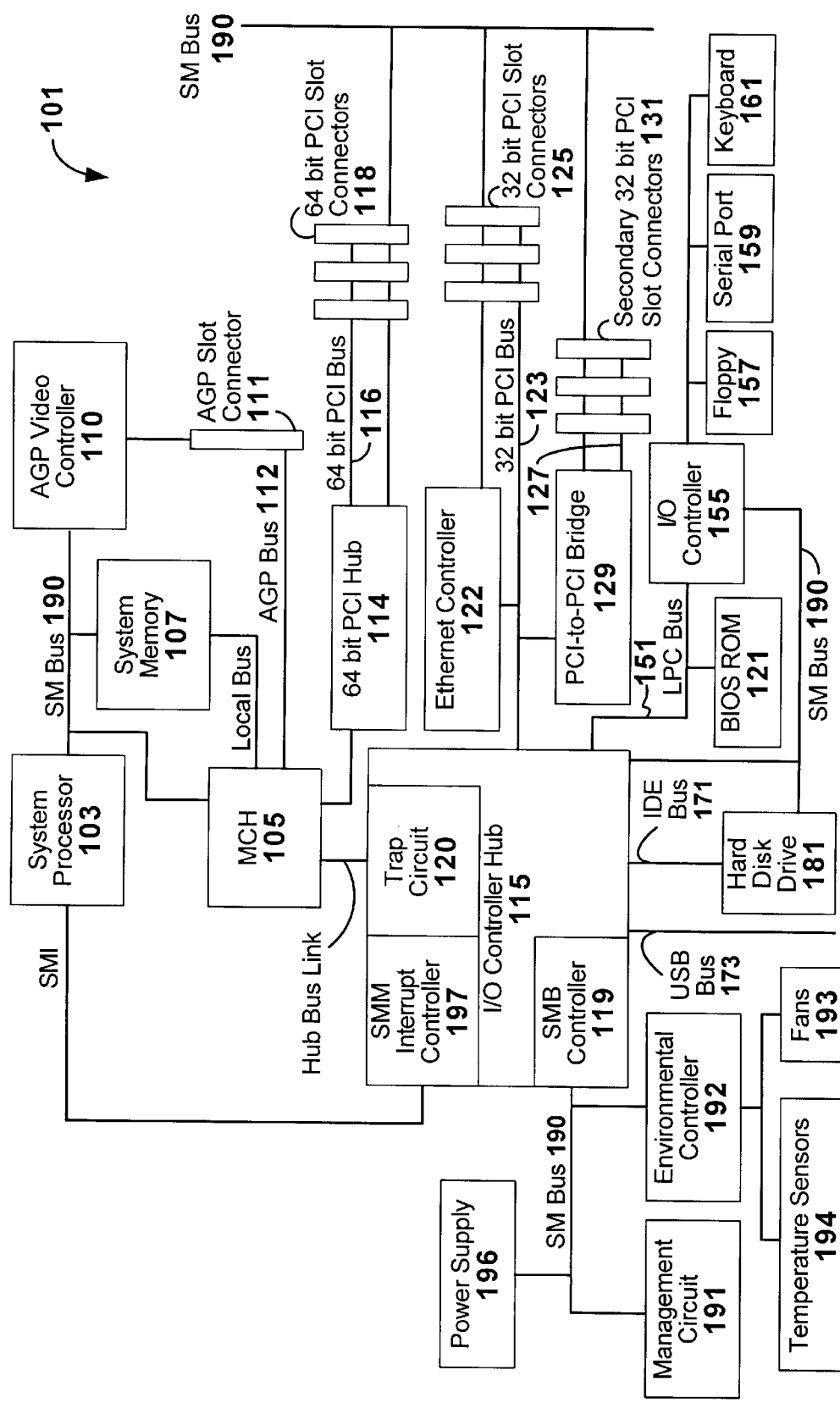
FIG. 1 is a block diagram of an example of a computer system.

FIG. 1 is a block diagram of computer system 101. Computer system 101 includes a system processor 103, a system memory 107, and number peripheral devices operably coupled to the system processor via computer system buses. An example of a computer system is the POWER EDGE 2400™ sold by the DELL COMPUTER CORP.

Computer system 101 includes a number of environmental circuits operably coupled to computer bus (SM bus) 190 for monitoring and/or controlling environmental operating parameters of computer system 101. In the embodiment shown, SM bus 190 is a serial computer bus that conforms to a System Management Bus Standard such as the System Management Bus Specification, Rev. 1.0. Environmental circuits operably coupled to SM bus 190 include temperature sensors (not shown) located in power supply 196, hard disk drive 181, I/O controller 155, I/O controller Hub 115, PCI bridge circuits 114 and 129, system processor 103, system memory 107, memory controller hub 105, and AGP video controller 110. Also, devices (not shown) located in PCI slot connectors 118, 125, and 131 include temperature sensors that are operably coupled to SM bus 190. Furthermore, SM bus 190 is operably coupled to various voltage sensors located in power supply 196 or located on the system board (not shown) for monitoring the voltage levels of computer system 101. With some systems, the voltage levels of computer system 101 may be adjusted via bus commands provided to power supply 196 via SM bus 190. SM bus 190 is also operably coupled to a management circuit 191 that logs error data and environmental data, and with some systems, provides the logged data to a remote monitoring system. An environmental controller 192 is operably coupled to SM bus 190. Environmental controller 192 controls certain environmental operating parameters for computer system 101. Environmental controller 192 monitors environmental conditions such as the internal temperature via temperature sensors 194 and adjusts the speed of fans 193 accordingly. The various portions of the SM Bus 190 shown in FIG. 1 are portions of the same bus but are shown disconnected for the simplification of FIG. 1.

Some computer systems implement operating systems (or other applications) having environmental monitoring routines for monitoring and/or adjusting the environmental operating parameters of the computer system. With these routines, the operating system is able to change particular operating parameters such as chassis temperature or fan turn-on temperature. One problem with such systems is that the environmental operating parameters are susceptible to an undesirable adjustment such as from computer viruses through the operating system or from inadvertent user manipulation. As will be shown later, computer system 101 includes a system for restricting access to environmental circuits accessible via SM bus 190.

Computer system 101 includes an system management bus controller (SMB controller) 119 that performs bus transactions on SM bus 190 to access circuits accessible via SM bus 190. Assigned to SMB controller 119 are a number I/O registers (See FIG. 3), whose contents SMB controller 119 operates on in performing bus transactions. To access a circuit on SM 190, an operating system routine (or other computer program) performs I/O writes to the I/O registers assigned to SMB controller 119 wherein SMB controller 119 operates on the contents of its assigned I/O registers to perform a bus transaction to carry out the circuit access.

In the embodiment shown, SMB controller 119 is implemented in I/O controller hub 115. In one example, I/O controller hub 115 is implemented with a PIIX4 chip sold by INTEL™.

Figure 2:
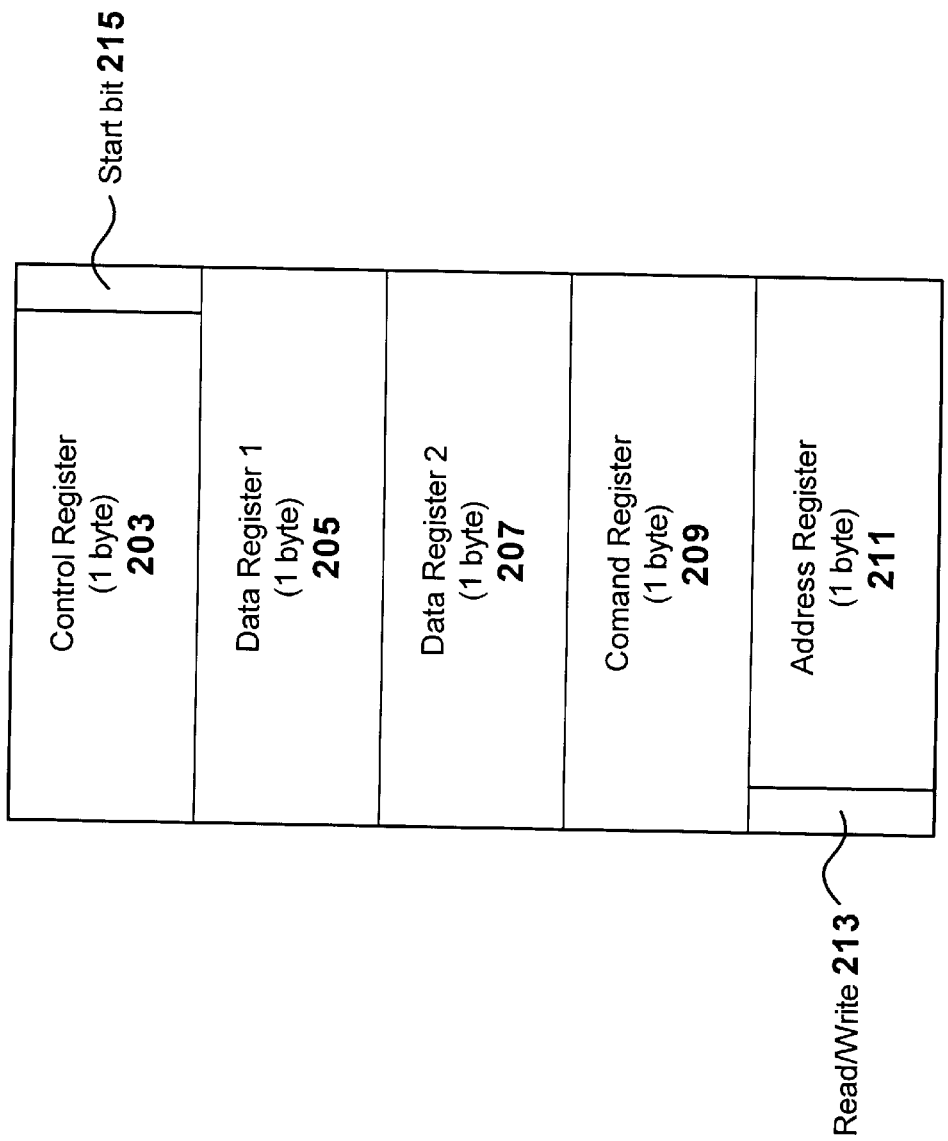
FIG. 2 is an example of a bus controller I/O register map.

FIG. 2 is an I/O register map for SMB controller 119. I/O registers assigned to SMB controller 119 include an I/O control register 203, two I/O data registers 205 and 207, an I/O command register 209, and an I/O address register 211. In one embodiment, the I/O registers shown in FIG. 2 are implemented in I/O controller hub 115. SMB controller 119 operates on the contents of the I/O registers in FIG. 2 to perform bus transactions on SM bus 190. I/O address register 211 contains a 7 bit address of the circuit to be accessed and a read/write indication bit 213 for indicating whether the circuit access is a read circuit access or a write circuit access. I/O command register 209 includes information as to what type of bus transaction is to be performed. With some embodiments, I/O command register 209 contains circuit register addresses of environmental circuit registers accessed by the bus transaction. Data registers 205 and 207 include data to be written to or data that is read from the circuits being accessed. I/O control register 203 includes control information passed from the operating system (or other application) to the SMB controller 119. For example, I/O control register 203 includes a start bit 215, that when contains a "1", indicates to SMB controller 119 to initiate a bus transaction according to the contents of its assigned I/O registers. Other I/O registers (not shown) may be assigned to SMB controller 119.

To access an environmental circuit on SM bus 190, an operating system or other application performs I/O writes to the I/O registers shown in FIG. 2 to write the appropriate information corresponding to a circuit access. Such information includes the address of the circuit to be accessed, the type of transaction to be performed, the data to be written or read, and control information. For example, the operating system performs an I/O write to I/O address register 211 to write the address of the circuit to be accessed and an I/O write to I/O command register 209 to write the type of command to be performed.

Computer system 101 implements a system to prevent specific types of circuit accesses from occurring in order to protect its environmental circuits from undesirable adjustment such as from computer virus attacks or inadvertent user manipulation. For example, a circuit access write to environmental controller 192 to change the turn-on temperature of fans 193 would be restricted in order to prevent the turn-on temperature from being set so high that the fans never operate.

In one embodiment, in order to restrict certain accesses to environmental circuits on SM bus 190, trap circuit 120 is programmed to trap I/O accesses to the I/O registers assigned to SMB controller 119. When trap circuit 120 traps an I/O access to an I/O register assigned to SMB controller 119, SMM interrupt controller 197 generates a system management interrupt (SMI) to the SMI terminal of system processor 103. In response to receiving the SMI, computer system 101 enters a system management mode (SMM) where system processor 103 executes BIOS SMM code in implementing an SMM handler. The SMM handler determines whether the I/O access that generated the trap corresponds to a restricted circuit access, and if so, prevents the circuit access from occurring.

Figure 3:
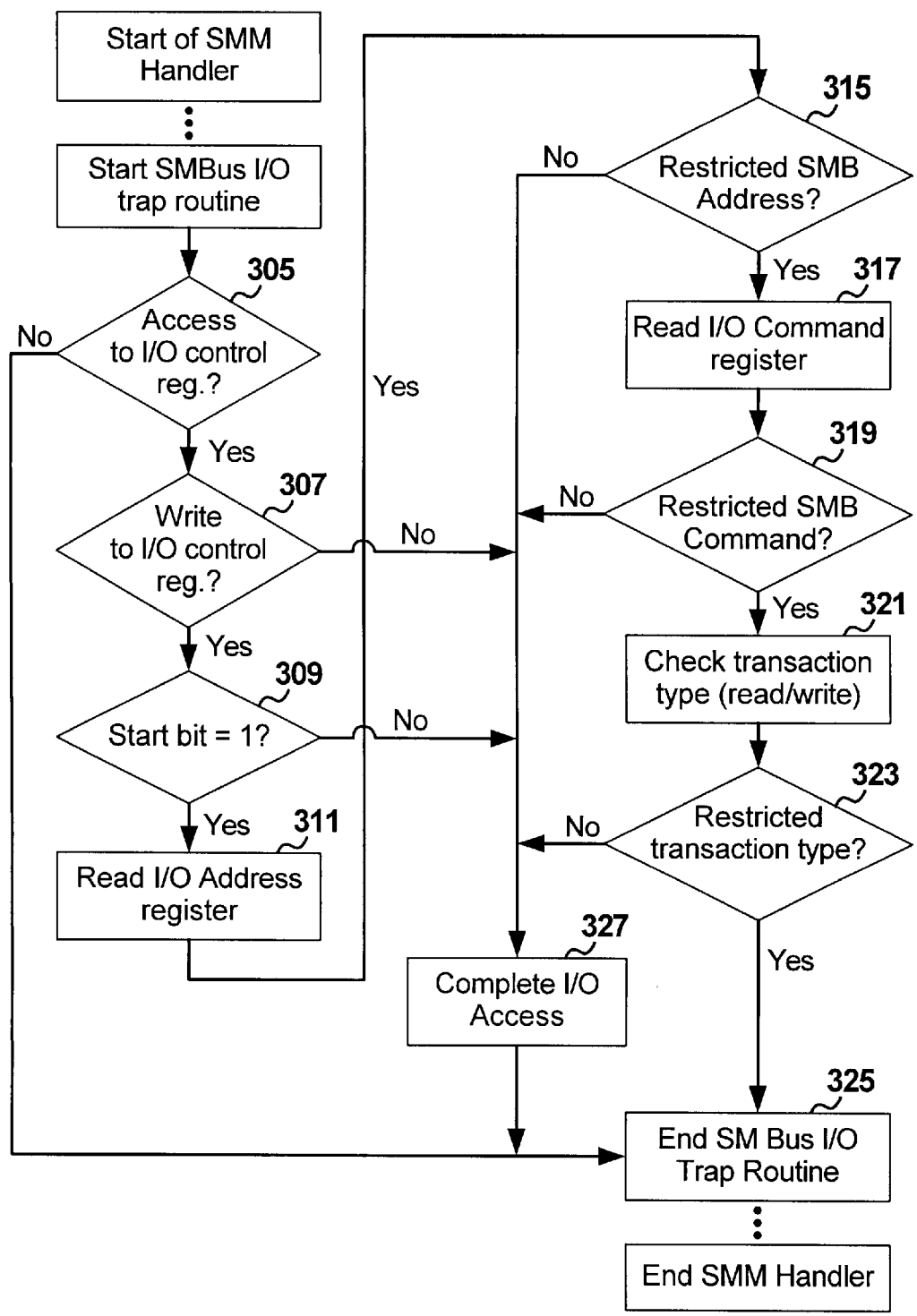
FIG. 3 is a flow diagram of an example of an interrupt handler routine for determining whether a circuit access is a restricted circuit access.

FIG. 3 shows one example of an interrupt handler routine (referred to as SM bus I/O trap routine) of an interrupt handler that determines whether an I/O access corresponds to a restricted circuit access. For the interrupt handler routine shown in FIG. 3, trap circuit 120 is programmed to trap all I/O accesses to I/O control register 203, wherein SMM interrupt controller 197 generates a SMI in response to the trap.

An SMI may be generated for a number of conditions other than a trapped I/O write to I/O control register 203. Accordingly, the SMM handler includes a number of other routines (not shown) that are run in SMM mode to determine whether the SMI was generated in response to a specific condition, and if so, to perform the appropriate operations for that condition.

The SM bus I/O trap routine first determines at 305 whether the SMI was generated in response to an I/O access to I/O control register 203. If no, the SM bus I/O trap routine ends at 325, and the remaining SMM handler routines (not shown) are performed. However, if the SMI was generated in response to an I/O access to I/O control register 203, then at 307, a determination is made whether the I/O access was an I/O write to I/O control register 203. If no at 307, then the trapped I/O read to I/O control register 203 is determined not to correspond to a restricted circuit access and the SM bus I/O trap routine completes the I/O read to I/O control register 203 at 327, wherein the SM bus I/O trap routine ends at 325. If the trapped I/O access is an I/O write, then at 309, the SM bus I/O trap routine determines whether the I/O write included a request to SMB controller 119 to initiate a bus transaction on SM Bus 190. In one embodiment, the SMM handler determines whether the trapped I/O write contains such a request by reading start bit 215. If start bit 215 is "0", then the trapped I/O write does not correspond to a bus transaction, wherein the SM bus I/O trap routine completes the I/O write to the I/O control register 203 at 327 and ends at 325. If yes at 309, then the SM bus I/O trap routine moves to 311.

At 311, the SM bus I/O trap routine reads I/O address register 211 to determine in 315 whether the address of the circuit access is an address for a circuit for which at least one type of circuit access is restricted. For example, reading the turn-on temperature of fans 193 from environmental controller 192 may not be a restricted circuit access wherein writing a new turn-on temperature is. A table of all of the restricted accesses, including the address, command, and transaction type of the restricted access, is originally stored in BIOS ROM 121 and shadowed into the SMM portion of system memory 107 during startup. If the address in I/O address register 211 is not an address of at least one restricted circuit access, then SM bus I/O trap routine in 327 completes the I/O write to I/O control register 203 and ends at 325.

If yes at 315, then the SM bus I/O trap routine at 317 reads the contents of I/O command register 209 at 317 to determine at 319 whether the command of the circuit access is a command that may be restricted depending upon the transaction type of the circuit access. If no at 319, then the SM bus I/O trap routine at 327 completes the I/O write to I/O control register 203 and ends at 325. If yes at 319, then the SMM handler checks the transaction type (circuit access read or circuit access write) by reading the contents of the read/write bit 213 at 321 to determine at 323 whether the transaction type of the circuit access is a restricted circuit access. If no at 323, the SM bus I/O trap routine at 327 completes the I/O write to I/O control register 203 and ends at 325. If yes at 325, then the SM bus I/O trap routine ends at 325 without having completed the trapped I/O write to I/O control register 203. Consequently, because a "1" is never written to start bit 215 of I/O control register 203, SMB controller 119 never performs the bus transaction that corresponds with the trapped I/O write, and thus, the circuit access is prevented from occurring.

In other embodiments, if trap circuit 120 can differentiate between an I/O write to I/O control register 203 and an I/O read to I/O control register 203, then the SM Bus I/O trap routine of FIG. 3 can be simplified to remove decision 307 and modify decision 305 to determine whether the SMI was generated due to a trapped I/O write to I/O control register 203. Also in other embodiments, some of the decisions and operations shown in FIG. 3 may be performed in different orders.

Figure 4:
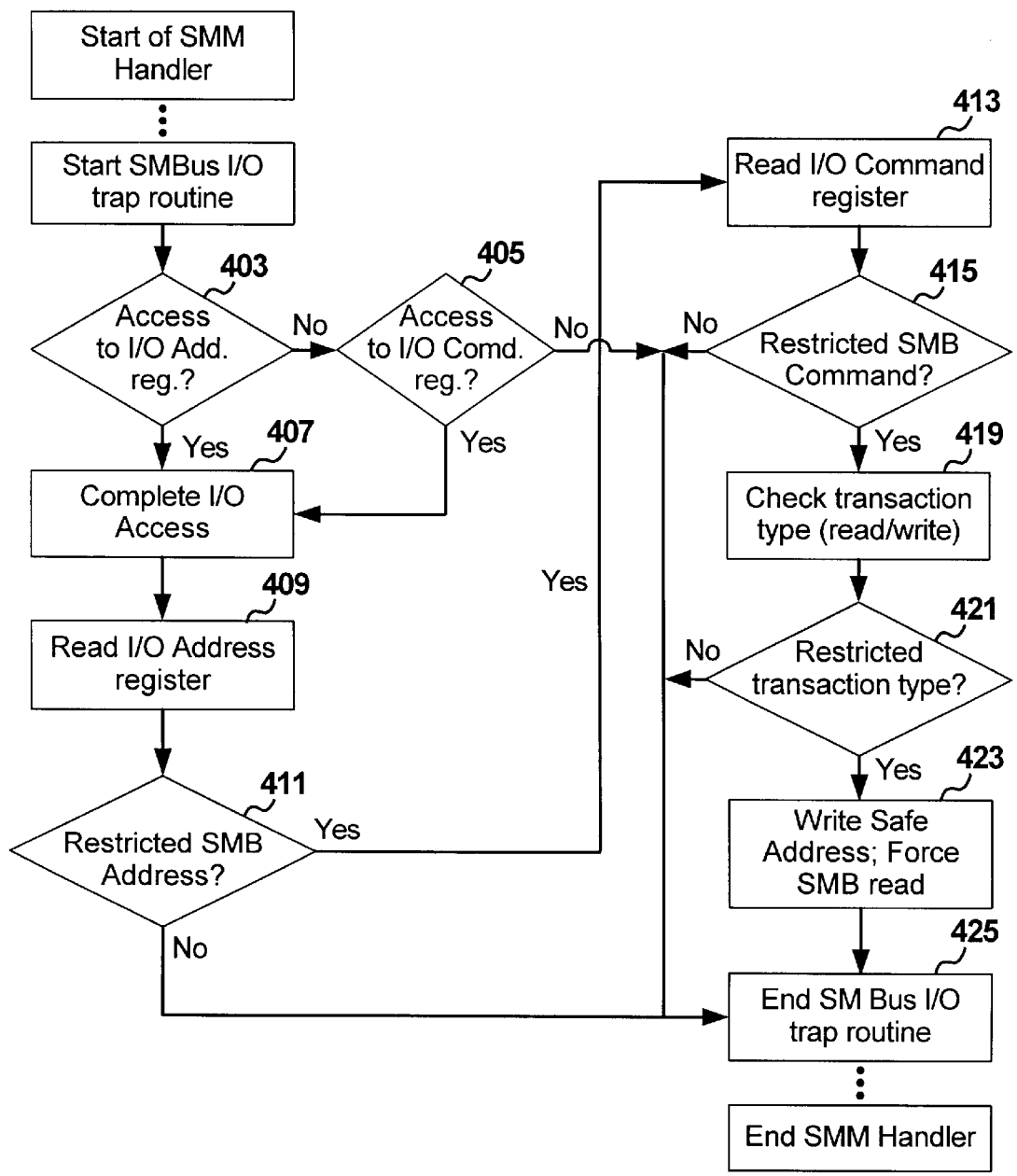
FIG. 4 is a flow diagram of another example of an interrupt handler routine for determining whether a circuit access is a restricted circuit access.

FIG. 4 shows another example of an interrupt routine of an interrupt handler that determines whether an I/O access corresponds to a restricted circuit access. For the interrupt handler routine shown in FIG. 4, trap circuit 120 is programmed to trap all I/O accesses to I/O command register 209 and I/O address register 211, wherein SMM interrupt controller 197 generates a SMI in response to the trap.

In 403, the SM bus I/O trap routine determines whether the SMI was generated in response to an I/O access to I/O address register 211. If no at 403, then the SM bus I/O trap routine determines at 405 whether the SMI was generated in response to an I/O access to I/O command register 209. If no at 405, then the SMI was not generated in response to an I/O access to an I/O register assigned to SMB controller 119, wherein the SM bus I/O trap routine ends at 425. If yes at either 403 or 405, then the SM bus I/O trap routine completes the I/O access to either I/O address register 211 or I/O command register 209 at 407.

At 409, the SM bus I/O trap routine reads the I/O address register 211 to determine at 411 whether the address of the circuit access is an address for a circuit for which at least one type of circuit access is restricted. If no at 411, then the SM bus I/O trap routine ends at 425. If yes at 411, then the SM bus I/O trap routine at 413 reads the contents of I/O command register 209 to determine at 415 whether the command of the circuit access is a command that may be restricted depending upon the transaction type of the circuit access. If no at 415, then the SM bus I/O trap routine ends at 425. If yes at 415, then the SM bus I/O trap routine checks the transaction type (circuit access read or circuit access write) by reading the contents of the read/write bit 213 at 419 to determine at 421 whether the transaction type of the circuit access is a restricted circuit access. If no at 421, the SM bus I/O trap routine ends at 425.

If yes at 421, then the trapped I/O access is determined to correspond to a restricted circuit access. At 423, the SM bus I/O trap routine writes a "safe" address to I/O address register 211 and writes a value indicating a read to read/write bit 213. Afterwards, the SM bus I/O trap routine ends at 425. A safe address is a value that has no adverse affects when a bus transaction is performed with that value as a circuit address. In one embodiment, the safe address written to I/O address register 211 is an address at which no circuit may be assigned or an address of a circuit whose reading will have no adverse affects. Thus, when the bus transaction is performed, the bus transaction with be a circuit access read to a non existent circuit or to a circuit where a circuit access read has no adverse affects. In one embodiment, the SMB alert response address is written to the I/O address register as a safe address. Accordingly, the restricted circuit access is prevented from occurring.

Because, an operating system or other application may write to either of I/O address register 211 or I/O command register 209 first, values in the other of I/O address register 211 or I/O command register 209 from a previous bus transaction may cause the SM bus I/O trap routine of FIG. 4 to erroneously prevent certain unrestricted transactions from occurring. Accordingly, in some embodiments, after every bus transaction, a SMI is generated wherein the SMM handler includes a routine that resets the values of the I/O command register 209 and the I/O address register 211 to non restricted values.

Referring back to FIG. 1, in one embodiment, system processor 103 is an X86 compatible processor such as, e.g., a PENTIUM III processor sold by INTEL™. System memory 107 is operably coupled to system processor 103 via a memory controller hub (MCH) 105, which, in one embodiment, is implemented with the 440BX chipset sold by INTEL™. A video controller 110 conforming to the Advanced Graphics Port Specification (AGP video controller) is mounted on a computer card (not shown) that is inserted into an AGP card slot connector 111, which is operably coupled to memory controller hub 105 via AGP bus 112.

Computer system 101 includes a number of other computer busses conforming to various computer bus standards that enable system processor 103 and system memory 107 to be operably coupled to multiple computer devices. Computer bus 116 is a 64 bit computer bus conforming to the Peripheral Component Interface (PCI) standard. 64 bit PCI card slot connectors 118 are located on computer bus 116 and are operably coupled to memory controller hub 105 via a 64 bit PCI hub 114. Computer bus 123 is a 32 bit computer bus conforming to the PCI specification. Located on PCI computer bus 123 are PCI card slot connectors 125 and an ethernet controller 122 which are mounted on the system board (not shown) of computer system 101. Computer bus 123 is operably coupled to system processor 103 via I/O controller hub 115. Computer system 101 also includes a secondary 32 bit PCI computer bus 127 operably coupled to computer bus 123 via a PCI-to-PCI bridge 129 with 32 bit PCI card slots 131 located on secondary bus 127. Several computer devices (not shown) are operably coupled to PCI busses 116, 123, and 127 including devices (not shown) located on computer cards inserted into card slot connectors 118, 125, and 131. Such devices include remote access circuits such as LAN connector circuits, modem circuits, and sound card circuits. Other devices operably coupled to computer system 101 via PCI computer busses 116, 123, and 127 include hard disk drives (not shown) operably coupled to a PCI computer bus via a SCSI controller (not shown). Other conventional computer devices (not shown) may be coupled via PCI busses 116, 123, and 127 and may be located either on computer cards or mounted to the system board (not shown).

Computer system 101 also includes computer bus 151 which conforms to the Low Pin Count (LPC) computer bus standard. LPC computer bus 151 is operably coupled to computer system 101 via I/O controller hub 115. Operably coupled to LPC computer bus 151 are BIOS ROM 121 and I/O controller 155. BIOS ROM 121 stores BIOS code including code for the SMM interrupt handler. Operably coupled to I/O controller 155 are a floppy disk drive 157, a serial port 159, and a keyboard 161. Computer system 101 also includes a computer bus 171 conforming to the Integrated Drive Electronics (IDE) standard and a computer bus 173 conforming to the Universal Serial Bus (USB) standard. A hard disk drive 181 is located on IDE bus 171. Hard disk drive 181 stores code for the operating system of computer system 101 as well as other applications.

Those of skill in the art will recognize that, based upon the teachings herein, several modifications may be made to the embodiments shown in FIGS. 1–4 and described herein. For example, a system for restricting particular circuit accesses may be implemented in other types, forms, and/or versions of computer systems. Also, such a system may be utilized to restrict circuit accesses to circuits located on other computer busses conforming to other computer bus standards including other serial computer busses.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A computer system comprising:
   a system processor;
   a system memory operably coupled to the system processor;
   a computer bus;
   a bus controller for controlling the computer bus;
   an input-output (I/O) register associated with the bus controller;
   a plurality of environmental circuits operably coupled to the computer bus; and
   a non-volatile memory storing computer code whose execution by the system processor implements an interrupt handler which determines whether an I/O access to the I/O register corresponds to a restricted circuit access to one or more of the plurality of environmental circuits.

2. The computer system of claim 1, wherein the interrupt handler is invoked in response to the I/O access to the I/O register.

3. The computer system of claim 2 wherein the interrupt handler completes the I/O access to the I/O register in response to determining that the circuit access to the environmental circuit is not restricted.

4. The computer system of claim 2 wherein the I/O register includes an I/O control register assigned to the bus controller.

5. The computer system of claim 2 further comprising:
   a interrupt controller configured to generate an interrupt in response to an I/O access to the I/O register.

6. The computer system of claim 5 wherein the interrupt is a system management interrupt (SMI).

7. The computer system of claim 2 wherein the I/O register includes an I/O address register.

8. The computer system of claim 2 wherein the I/O register includes an I/O command register.

9. The computer system of claim 1 further comprising:
   an I/O address register assigned to the bus controller;
   wherein the interrupt handler accesses the I/O address register to determine whether an address of the circuit access is an address of a restricted circuit access.

10. The computer system of claim 9 wherein the interrupt handler writes a safe address to the I/O address register in response to determining that the circuit access is a restricted circuit access.

11. The computer system of claim 1 further comprising:
    an I/O command register assigned to bus controller;
    wherein the interrupt handler accesses the I/O command register to determine whether a command of the circuit access is an address of a restricted circuit access.

12. The computer system of claim 1 wherein the computer bus is a serial computer bus.

13. The computer system of claim 12 wherein the serial computer bus substantially conforms to a standard based upon a system management bus specification.

14. The computer system of claim 1 wherein the computer code is implemented in BIOS computer code.

15. A method for restricting access to environmental circuits operably coupled to a computer bus, the method comprising:
generating an interrupt in response to an I/O access to an I/O register assigned to a bus controller of the computer bus;
determining whether the I/O access corresponds to a restricted circuit access to an environmental circuit operably coupled to the computer bus;
preventing the circuit access depending upon whether the I/O access is determined to correspond to a restricted circuit access.

16. The method of claim 15 wherein the generating an interrupt includes generating an interrupt in response to an I/O access to an I/O control register assigned to the bus controller.

17. The method of claim 16 wherein the generating an interrupt further includes generating an interrupt in response to an I/O write to the I/O control register assigned to the bus controller.

18. The method of claim 15 wherein the determining whether the I/O access corresponds to a restricted circuit access further includes determining whether an address of the circuit access is an address of a restricted circuit access.

19. The method of claim 18 wherein the determining whether the address of the circuit access is an address of a restricted circuit access further includes reading an I/O address register assigned to the bus controller.

20. The method of claim 15 wherein the determining whether the I/O access corresponds to a restricted circuit access further includes determining whether a command of the circuit access is a command of a restricted circuit access.

21. The method of claim 20 wherein the determining whether the command of the circuit access is a command of a restricted circuit access further includes reading an I/O command register assigned to the bus controller.

22. The method of claim 15 wherein the determining whether the I/O access corresponds to a restricted circuit access includes determining whether the circuit access is a circuit read access or a circuit write access.

23. The method of claim 15 wherein the generating an interrupt in response to an I/O access to an I/O register assigned to the bus controller further includes generating an interrupt in response to an I/O access to an I/O address register assigned to the bus controller or an I/O access to an I/O command register assigned to the bus controller.

24. The method of claim 15 wherein the preventing the circuit access includes writing a safe address to an I/O address register assigned to the bus controller.

25. The method of claim 15 wherein the determining and the preventing further include executing an interrupt handler routine in response to a system processor of the computer system receiving the generated interrupt.

26. The method of claim 25 further comprising:
completing by the interrupt handler the I/O access in response to determining that the I/O access does not corresponds to a restricted circuit access.

27. The method of claim 15 wherein the computer bus is a serial computer bus.

28. A computer system comprising:
a system processor;
a system memory operably coupled to the system processor;
a serial computer bus operably coupled to the system processor,
a plurality of environmental circuits operably coupled to the serial computer bus and accessible via the serial computer bus;
a serial bus controller;
a plurality of I/O registers assigned to the bus controller, the plurality of I/O registers including an I/O command register, an I/O address register, and an I/O control register, the serial bus controller operating on contents of the I/O command register, I/O address register, and I/O control register to perform bus transactions on the computer bus for circuit access to environmental circuits of the plurality, the plurality of environmental circuits are accessible via circuit accesses by I/O accesses to the plurality of I/O registers;
a trap circuit for trapping an I/O access to at least one of the plurality of I/O registers;
an interrupt controller having an output to generate an interrupt in response to the trap circuit trapping an I/O access to at least one of the plurality of I/O registers;
a non-volatile memory storing code whose execution by the system processor implements an interrupt handler in response to an interrupt generated by the interrupt controller due to a trapped I/O access to an I/O register of the plurality, the interrupt handler determines whether a circuit access corresponding to the trapped I/O access is a restricted circuit access.

29. The computer system of claim 28 wherein an interrupt is generated on a trapped I/O access to the I/O control register.

30. The computer system of claim 29 wherein the interrupt is generated on a trapped I/O write to the I/O control register.

31. The computer system of claim 28 wherein the interrupt handler completes the trapped I/O access in response to determining that the trapped I/O access does not correspond to a restricted circuit access.

32. The computer system of claim 28 wherein the serial computer bus substantially conforms to a standard based upon a system management bus standard.

* * * * *